United States Patent
Schlegel et al.

(10) Patent No.: US 7,768,990 B1
(45) Date of Patent: Aug. 3, 2010

(54) MULTI-USER RECEIVER AND METHOD FOR SUCCESSIVE ACQUISITION

(75) Inventors: Christian Schlegel, Park City, UT (US); Samuel C. Kingston, Salt Lake City, UT (US); Thomas R. Giallorenzi, Riverton, UT (US); Michael Rice, Provo, UT (US); June Sun, Salt Lake City, UT (US)

(73) Assignee: L3 Communications Corporation, New York, NY (US)

( * ) Notice: Subject to any disclaimer, the term of this patent is extended or adjusted under 35 U.S.C. 154(b) by 1211 days.

(21) Appl. No.: 11/351,363

(22) Filed: Feb. 9, 2006

(51) Int. Cl.
  *H04J 3/00* (2006.01)
(52) U.S. Cl. .................. 370/345; 370/347; 375/147; 375/148
(58) Field of Classification Search .............. 370/347, 370/345; 375/147, 148
  See application file for complete search history.

(56) References Cited

U.S. PATENT DOCUMENTS

2008/0285692 A1* 11/2008 Buchert et al. .............. 375/346

* cited by examiner

*Primary Examiner*—Vincent P Harper
*Assistant Examiner*—Khai M Nguyen
(74) *Attorney, Agent, or Firm*—Harrington & Smith

(57) ABSTRACT

A method for acquiring signals received from multiple users in a single burst groups signals by power and sequentially processes the signal groups. A received sum of a plurality of user signals received in a burst is stored, and the transmitted symbols for each signal within a first group of the stored signals is estimated. A modified set of signals is then determined that excludes the signals of the first group. From the modified set of signals, the method continues by canceling multiuser interference among signals within a second group, and estimating transmitted symbols for each signal within the second group. The first and second groups includes all signals within a power band that defines the group, and the first band represents a higher power band than the second. Such iterative processing may continue for sequentially lower power bands until all signals are processed. A receiver is also detailed.

8 Claims, 11 Drawing Sheets

| FIG.3A | FIG.3B | FIG.3C | FIG.3D |
| --- | --- | --- | --- |
| FIG.3E | FIG.3F | FIG.3G | FIG.3H |

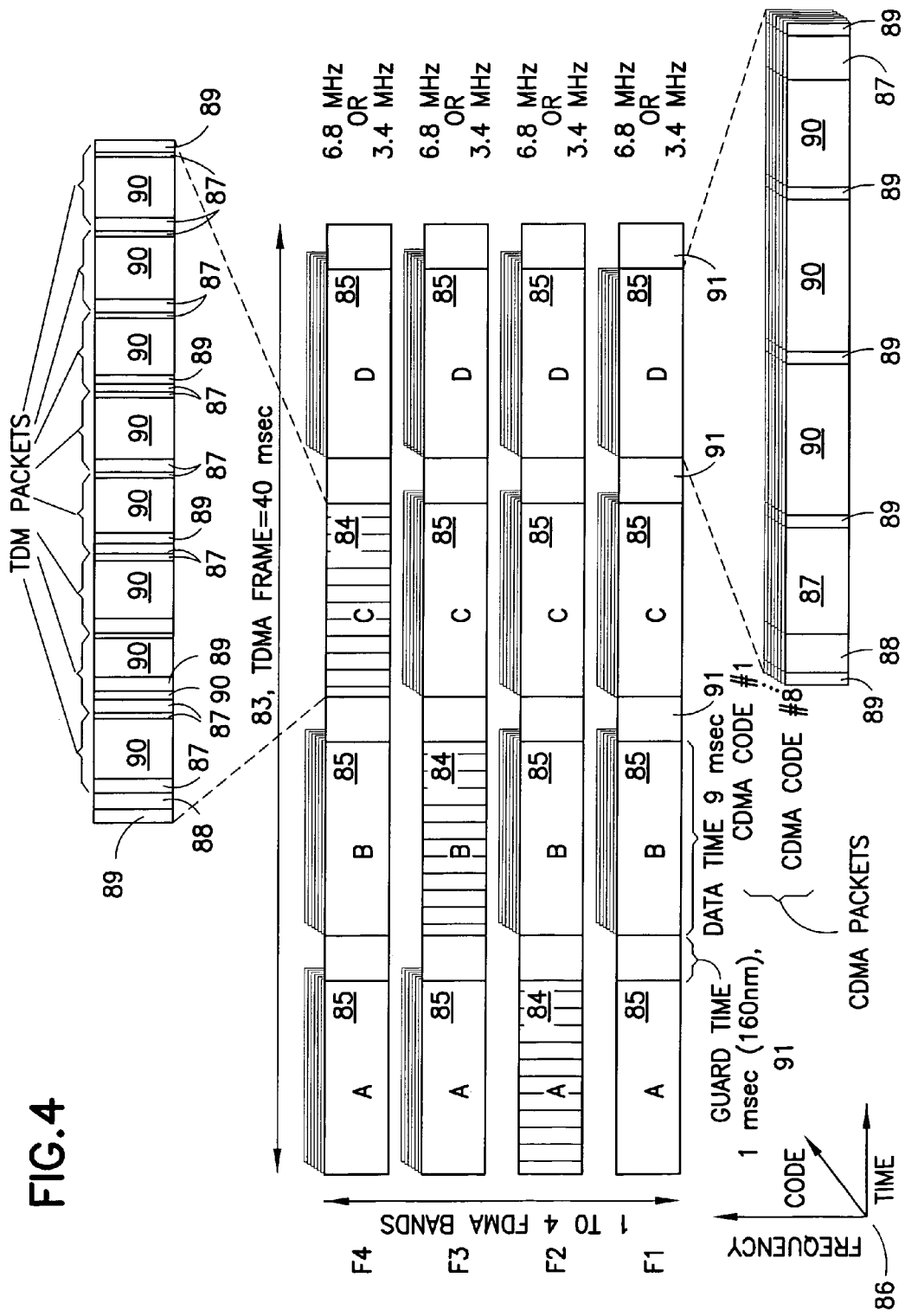

MULTI-USER RECEIVER AND METHOD FOR SUCCESSIVE ACQUISITION

FIELD OF THE INVENTION

The present invention relates to multiuser receivers and methods in a wireless communication system.

BACKGROUND

To meet the need for ever-increasing information capacity in wireless communication systems, research efforts have recently turned to the physical layer to increase spectral efficiency. One aspect of this research relevant to this invention is in the area of multiuser receivers. These receivers seek to minimize interference between mutual users of a spread spectrum wireless system, and generally include multiuser detectors, linear decorrelators, and linear minimum mean-square-error (MMSE) receivers. An important distinction between multiuser receivers and their matched-filter counterparts is that multiuser receivers delve into the structure of interference among disparate (simultaneous) users or the system in order to demodulate the signal of one particular user of interest.

Certain prior art receivers combat different types of interference to increase either information-carrying capacity (traditional capacity, such as defined by the Shannon limit), or user capacity, the latter being the maximum number of users from which a multiuser receiver may reliably demodulate the intended signal. These prior art receivers rely on the difference in user power levels being within a quite narrow range in order that stronger signals not produce excessive interference to weaker signals.

Regardless of the practical application of the above receivers to cellular communications where effective power control among users is a viable assumption, there exist wireless systems where that assumption does not hold, and where Doppler effects are so great that power control for every burst is not practical, or where a signal must reach a receiver more remote than the one interfered with. Such a system 20 is shown in FIG. 1.

FIG. 1 depicts a series of nodes communicating with one another over a wireless network, preferably secure. Assume a first node 22 carries a multiuser receiver, and wishes to receive communications from any of the other nodes. A second 24 and third 26 node are nearest to the first, and traditional power control is not necessarily impractical as between them and the first node 22. A fourth 28 and fifth 30 nodes are located proximal to one another as compared to the first node 22, but are moving in different directions at high speed. Doppler effects are opposed and not negligible. Direct power control to the extent achieved in cellular communications is impractical for them, because each node 28, 30 changes its distance from the first node 22 rapidly, and power control cannot keep up with the spatial changes between nodes. As the fourth node 28 closes on the first node 22, its signal carries a higher power level that will obscure the signal from the fifth node 30, whose power level as seen by the first node 22 is receding. Traditional open/closed loop power control will lag behind the power levels of the various users seen by the first node 22, essentially blinding it to at least some of the transmissions from the other nodes.

Anticipatory power control based on expected relative position might resolve the above problem were the system 20 a cellular one. Traditional power control presumes that only a single node need receive transmission from multiple users. In that model for example, a cellular base station uses a multiuser receiver and individual cellular users each use a RAKE receiver. But where the system 20 of FIG. 1 is a mesh network, any of the various nodes may include a multiuser receiver to receive transmissions from any other node. In that instance, anticipatory power control may work to constrain received signals to within a narrow power range for one of the nodes, but will expand, even beyond a range that would exist in the absence of power control, the power range for those same signals when they are received by other nodes (depending upon the location of those other nodes).

The above is generally termed in the art as a near-far power imbalance. In the system 20 of FIG. 1, the difference in power for various signals received at the first node 22 may be several orders of magnitude. At any given instant, the first node 22 may seek to receive a signal from what it sees as the strongest fourth node 28 and a weakest seventh node 34. A sixth node 32 may simultaneously seek to receive a signal from what is sees as an intermediate strength fifth node 30 and a weakest second node 24. What is needed in the art is a multiuser receiver that can operate reliably in such an environment. Specifically, what is needed is a multiuser receiver and method that can resolve any of several received user signals whose power levels span at least an order of magnitude range, and preferably greater.

SUMMARY OF THE INVENTION

This invention is in one aspect a method for acquiring signals received from multiple users in a single burst. Essentially it groups signals by power (preferably by decreasing power) and sequentially processes these groups. The method includes storing in a memory the received sum of a plurality of user signals received in a burst, and estimating transmitted symbols for each signal within a first group of the set of signals. The first group is characterized in that each signal within the first group exhibits a received power level within a first power range hereafter called a band. The first group includes signals from at least one user. The method further includes determining a modified set of signals that excludes the signals of the first group. From the modified set of signals, the method continues by canceling multiuser interference among signals within a second group, the second group also including at least one user signal. The second group is characterized in that each signal within the second group exhibits a received power level within a second band, and a lower bound of the second band is less than a lower bound of the first band. Further in the method, transmitted symbols for each signal within the second group are estimated.

According to another aspect, the present invention is a receiver for estimating signals from multiple users received in a single burst. The receiver has an antenna, a buffer, a search processor, a despreader, an equalizer, a decoder, and a feedback loop. The buffer is for storing a set of signals received in a burst from at least two users. The search processor has an input coupled to an output of the buffer, and is for determining signal timing and other parameters. The despreader has an input coupled to an output of the filter, and is for despreading a particular signal in a group. The group includes all signals of the set having a power within a particular power band. The equalizer removes multiuser interference using prior art techniques. The decoder has an input coupled to the equalizer, and is for estimating transmitted symbols for each of the signals of the group. The feedback loop removes the symbol estimates from the procedure for the next group.

These and other features, aspects, and advantages of embodiments of the present invention will become apparent with reference to the following description in conjunction with the accompanying drawings. It is to be understood, however, that the drawings are designed solely for the purposes of illustration and not as a definition of the limits of the invention.

BRIEF DESCRIPTION OF THE DRAWINGS

The present invention is described below more particularly with reference to the following drawing figures, which are not to scale except where stipulated.

FIG. 4 is a schematic diagram of a hybrid waveform particularly adapted for a mesh network, in which the inventive multiuser receiver may operate.

DETAILED DESCRIPTION

Figure 1:
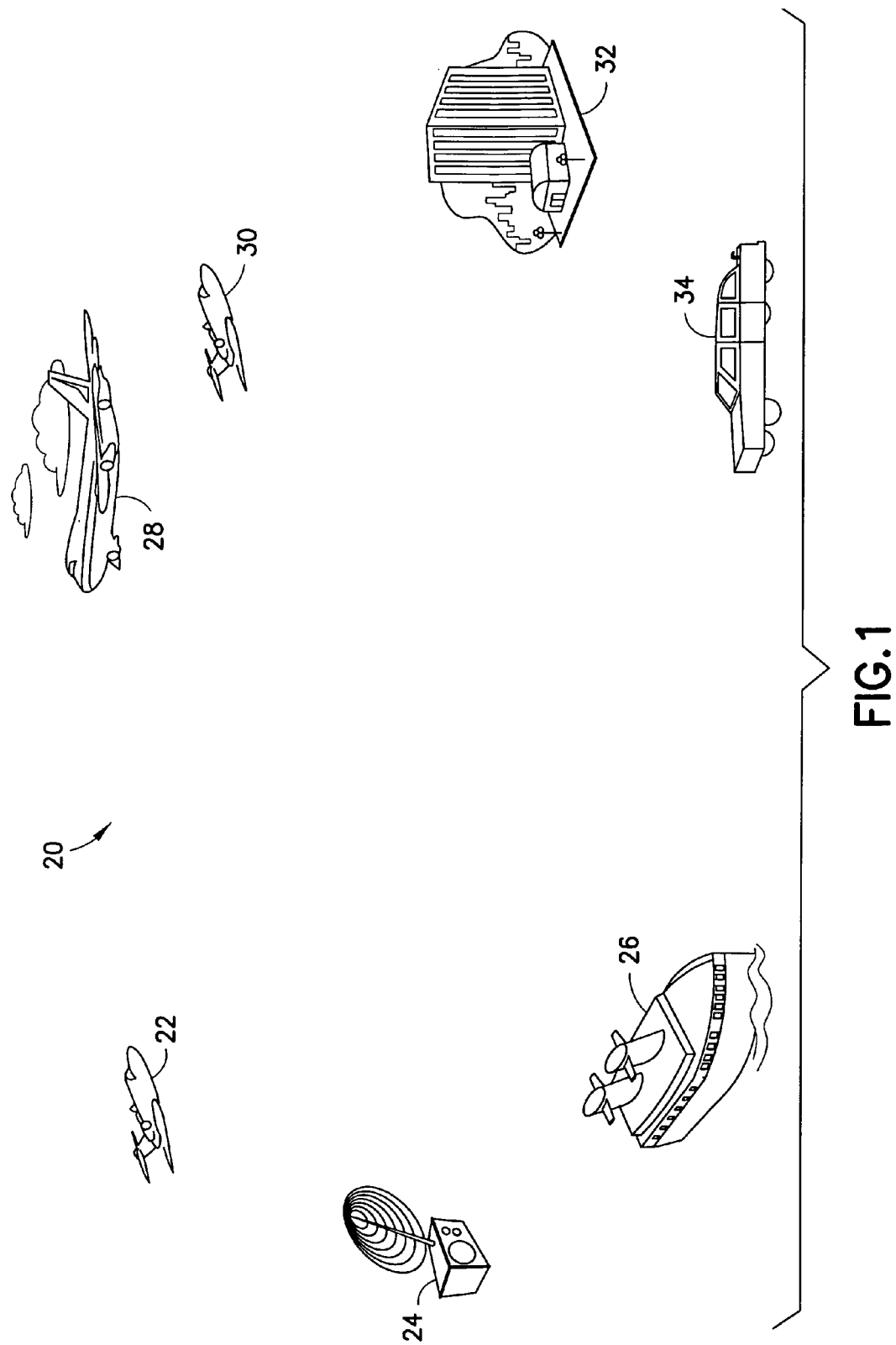
FIG. 1 is a schematic diagram of nodes in a wireless mesh network communication system.

In a preferred embodiment, the present invention buffers the received waveform which is the sum of a set of signals received from a plurality of users. From this buffered set of signals, the inventive receiver operates iteratively on sets of signals that are somewhat matched in received power level. The strongest signals are equalized, demodulated despread and decoded, and the transmitted symbols are estimated from those strongest signals. They are then re-spread, subtracted from the full set of buffered signals to yield a modified set of received signals, and the process is repeated for the strongest set of signals remaining within the modified set of signals. This may be continued until all user signals are processed and detected. Upon receipt of the next burst, the entire process is repeated for signals received in that burst.

The specifics are broadly described. Assume that each of the buffered signals is received with a power level that differs from at least some of the other signals. Some but not necessarily all define a unique received power level. These different power levels may be conceptually parsed into power level bands, each having an upper and lower bound, on which the receiver operates as a block. The multiuser receiver of the present invention first takes from the buffered signals those within the highest power level band, a first group. That these signals are referred to as a group of user signals does not necessitate that there is more than one user signal in a group; each group, or any of the several groups, may have only one user signal within the power level band that defines the group. The multiuser receiver uses an MMSE equalizer to cancel multiuser interference within that first group. As the near-far power imbalance among signals of the first group is limited by the power band concept, the equalizer can dramatically suppress multiuser interference for signals that it processes as a block, those within a single power band. The carrier phase and frequency are then acquired for each user signal within that first group, and error control decoding is performed on each user signal in the first group. These signals may then be further processed conventionally, but are also split into a feedback line where they are re-spread and subtracted from the original set of buffered signals set (all signals originally received in the burst). Term this a modified set of signals, which replaces the set of stored signals in the buffer. The modified set of signals is identical to the original except that the signals of the first (highest) power band (on this first iteration) are stripped off. The above process is repeated iteratively on the remaining strongest signals of the modified set (which changes on each iteration) until all signals in all processed power bands are demodulated, despread and detected. Each iteration operates on signals within a progressively lower power band than the previous iteration. For signals within the last (lowest) power band, there is no need to re-spread and subtract from the modified signal set, as all desired signals are detected by that point.

Assignment of a signal to a particular power band can be made on a variety of bases including measurements from previous bursts and searching for all possible signals and selecting only those from the maximum power to some level below it for further processing.

Figure 2:
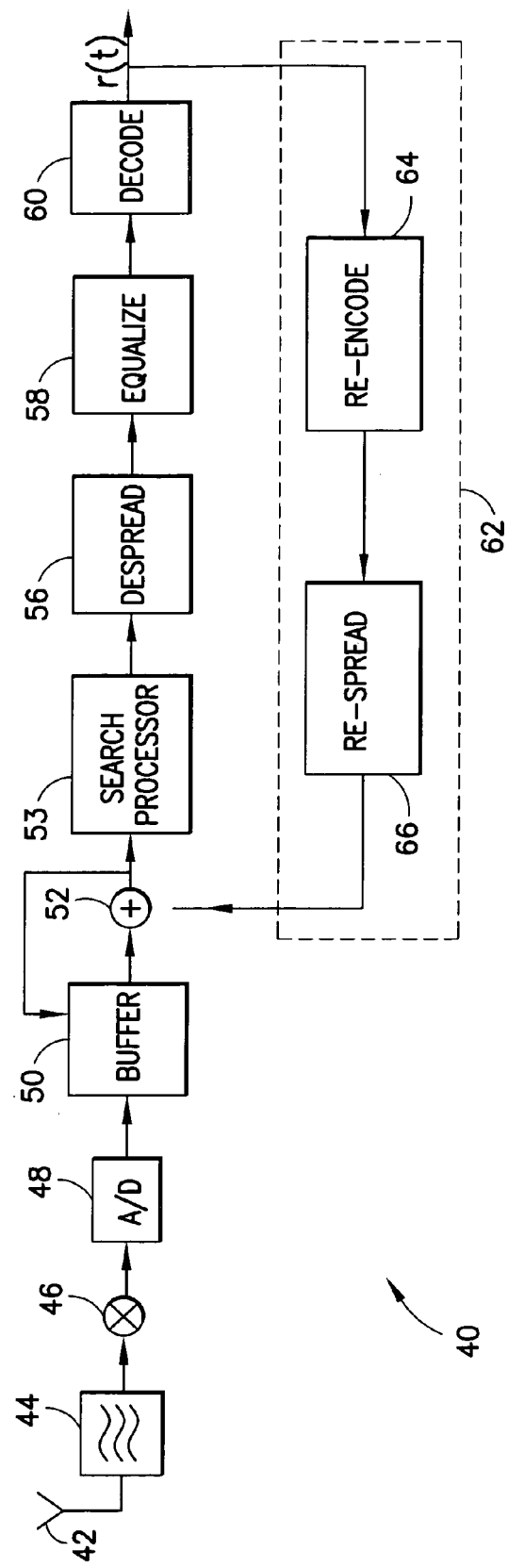
FIG. 2 is a high-level block diagram showing relevant portions of the preferred embodiment of the multiuser receiver.

FIG. 2 is a high-level block diagram showing relevant portions of the preferred embodiment of the multiuser receiver 40. Signals from multiple users over a single burst are received at one or more antennas 42, and pass through a filter 44, downconverter 46, and digital-to-analog converter 48 that digitally samples the analog input signals, and stores them in a buffer 50. Within the buffer then is a plurality of user signals received in a single burst, the original and full set of such signals. At this first iteration, an adder 52 does not modify the set of signals output from the buffer 50. A search processor 53 receives the set of signals from the adder 52 and operates on only those signals of the set within a first group, preferably estimating timing, power and noise for signals in the first group. If the grouping is initially unknown the search processor 53 can operate on all signals which can then be grouped for further processing. The first group includes only those signals within a highest power band, and preferably the power band spans no more than about 10 dB.

Assume for clarity of description that the first power band spans>30-40 dB, a second power band spans>20-30 dB, a third power band spans>10-20 dB, and a fourth power band spans 0-10 dB. Assume further that, for signals received by the first node 22 of FIG. 1, those received from the second 24 and third 26 nodes are within the first power band, those from the fourth 28 and fifth 30 nodes are within the second power band, and those from the sixth 32 and seventh 34 nodes are within the third power band.

The signals of the first group are each despread at a correlator 56 and preferably equalized at a MMSE equalizer 58 which possibly uses parameters from the search processor to suppress multiuser interference among the signals in the first group. It is preferred that multiuser interference suppression occur only among a power-limited group of signals to maximize suppression; suppressing interference with a very high near-far power imbalance is typically much less effective. The equalized and despread signals of the first group are then decoded at a decoder 60 to result in estimates r(t) of the transmitted symbols from each user of the first group, the signals received in the subject burst from the second 24 and third 26 nodes. Downline in the receiver 40 (not shown), these estimated symbols are processed as in the prior art.

The estimates symbols r(t) from the decoder, which in this first iteration represent the signals from users in the first group (second 24 and third 26 nodes), are then partially processed as if they were to be transmitted again, so as to be in the proper form to re-combine with the set of signals stored in the buffer 50 (currently, from each of the second through seventh nodes) and cancel themselves from that stored set. This occurs in a feedback loop 62. While this may be done in any number of ways that will be evident to those skilled in the art, it is depicted in FIG. 2 as a re-encoder 62 (or simply an encoder) that encodes the previously decoded symbols r(t) of the first group (the second 24 and third 26 nodes), and a re-spreader 66 (or simply a spreader) that re-applies the spreading code used to despread the signals of the first group along the forward processing path at the correlator/despreader 56. The re-spread signals of the first group are appropriately phase shifted and then inverted and added to (or subtracted from) the set of signals stored in the buffer 50 at the adder 52, leaving the original set of all user signals for that same original burst, less the signals of the first group. Term this a first modified signal set, and it is stored in the buffer 50 via a buffer feedback 68, replacing the previously stored (original, in this iteration) signal set.

Using the above assumptions that correlate this description to FIG. 1, after the above signal subtraction, the first modified signal set that is input into the search processor 53 and also now stored in the buffer 50 includes the signals from the fourth through seventh nodes, for that same original transmission burst. The search processor 53 then operates on only those signals of the first modified signal set within the highest power band available in that first modified set, which in this instance are signals from the fourth 28 and fifth 30 nodes that are received with power between >20 and up to 30 dB. This is a second group of signals, and as above, the search processor preferably estimates timing, energy and noise for signals in that second group. These signals of the second group are despread, equalized, and decodes as with the first group, and re-encoded, re-spread, phase shifted, and fed back into the adder 52.

Keeping in mind that the original signal set in the buffer 50 was previously replaced with the first modified set, the signals of the second group are then stripped from the buffered first modified set to leave a second modified signal set, which in the example includes signals received during the same original burst from the sixth 32 and seventh 34 nodes with power levels in the range of >10 to 20 dB, the third power band. Term this a second modified signal set, which as before, replaces the previously-stored signal set in the buffer 50. While the search processor 53 operates only on the signals in the second modified signals set within the highest available power band, in the example, that constitutes the entire second modified signal set. After forward processing (despread, equalize and decode) as above, this second modified signal set may be fed back 62 into the adder 52 to cancel the entire second modified signal set from the buffer 50, or the buffer may merely be dumped when no further signals remain to be processed. This dumping can occur based on a signal energy in the buffer falling below a threshold, a difference between the currently modified signal set and the group of signals being operated falling below a threshold, or other algorithms that would negate the need for the inconsequential reverse processing (re-encode and re-spread) of the final modified signal set.

Figure 3A:
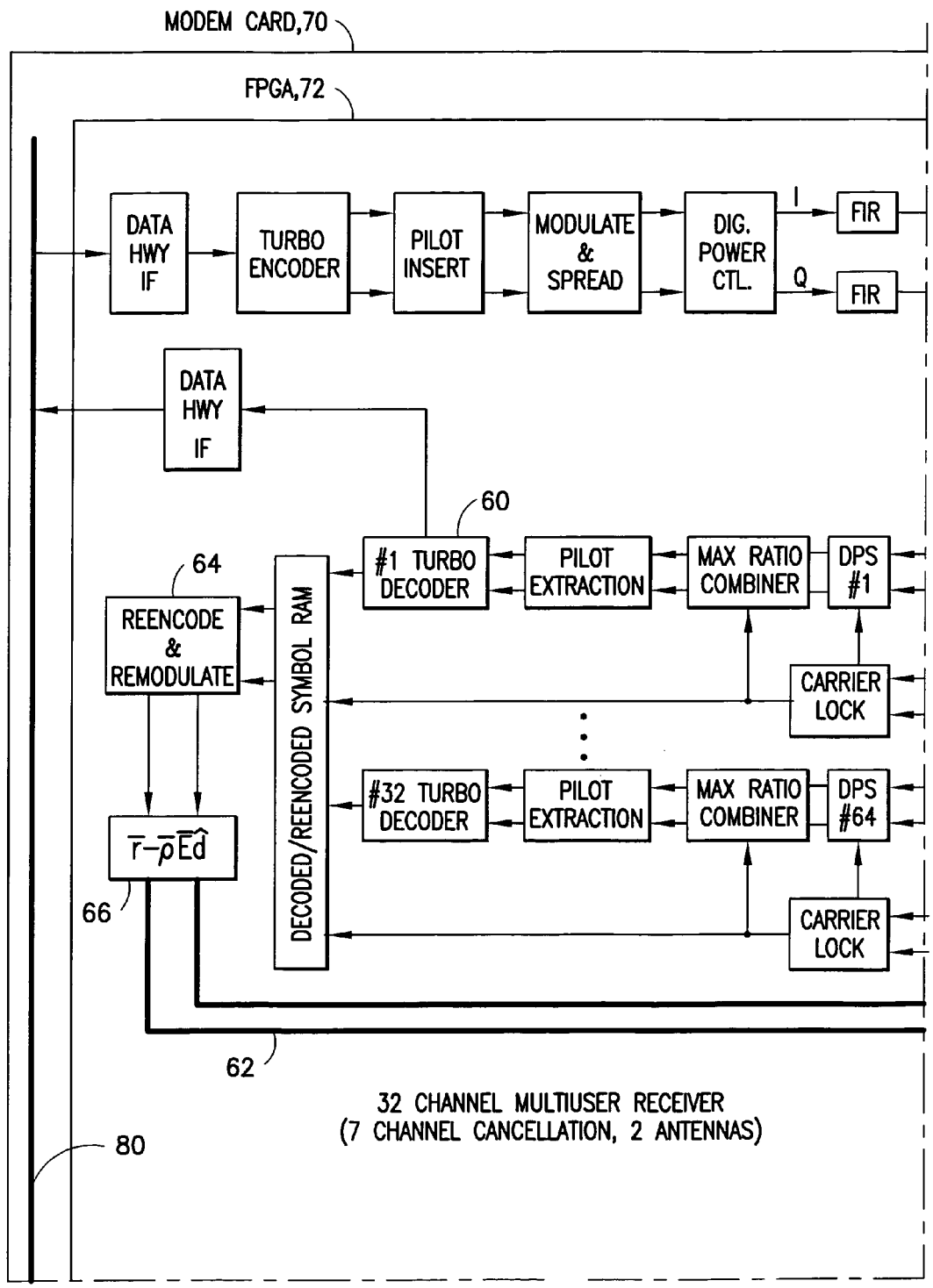
FIG. 3 is a detailed block diagram of the receiver front end, showing additional detail as compared to that of FIG. 2.
Figure 3B:
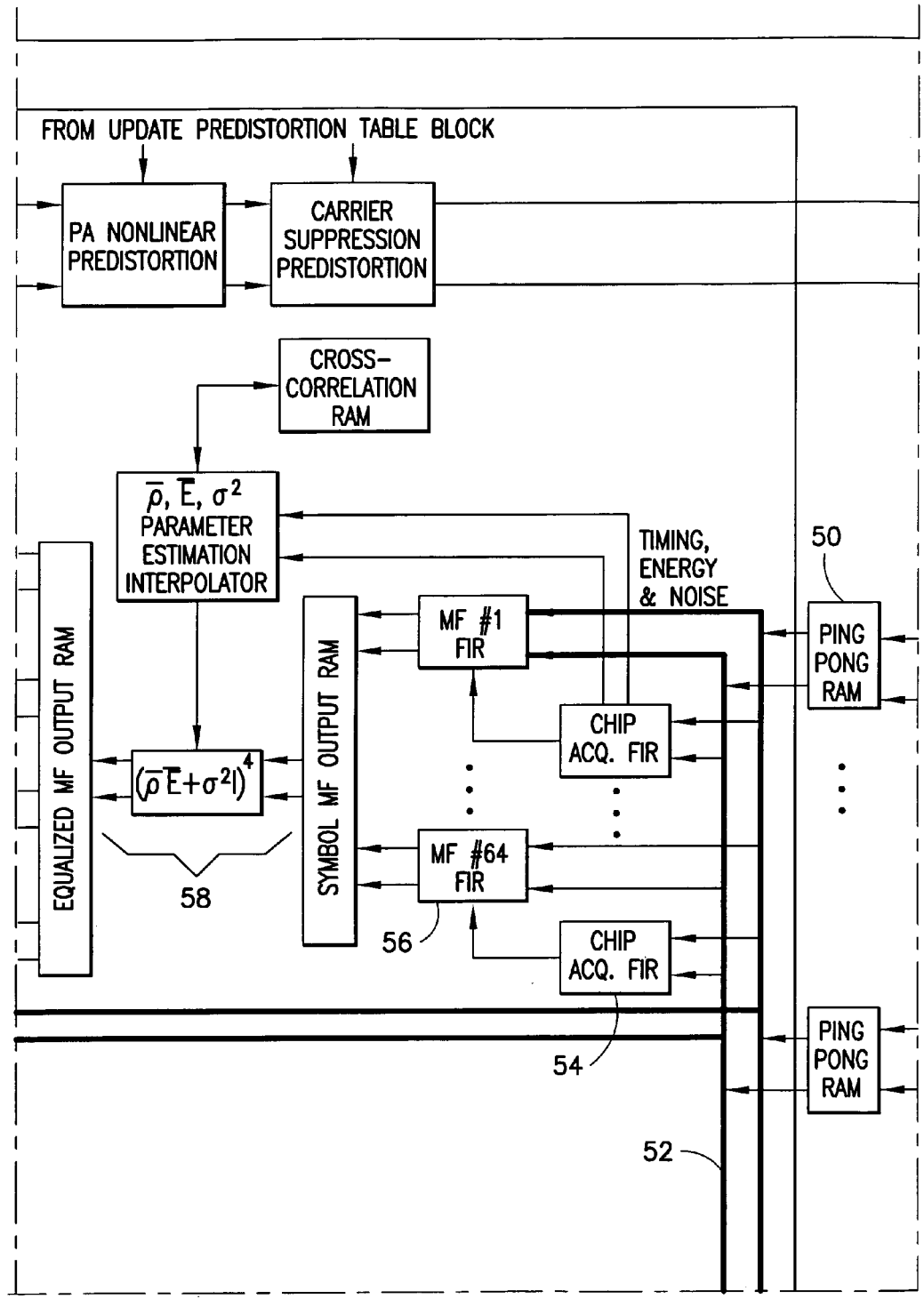
Figure 3C:
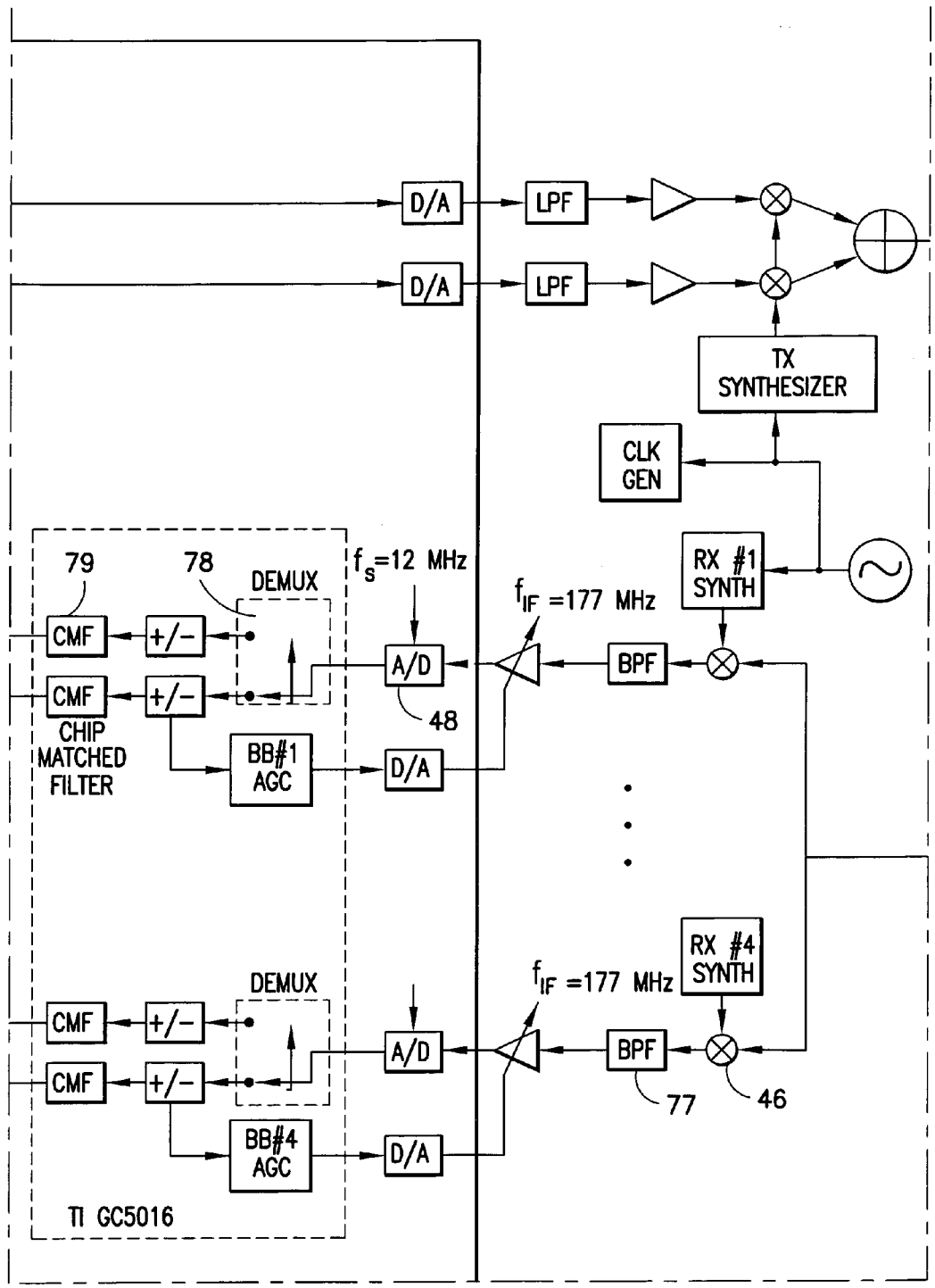
Figure 3D:
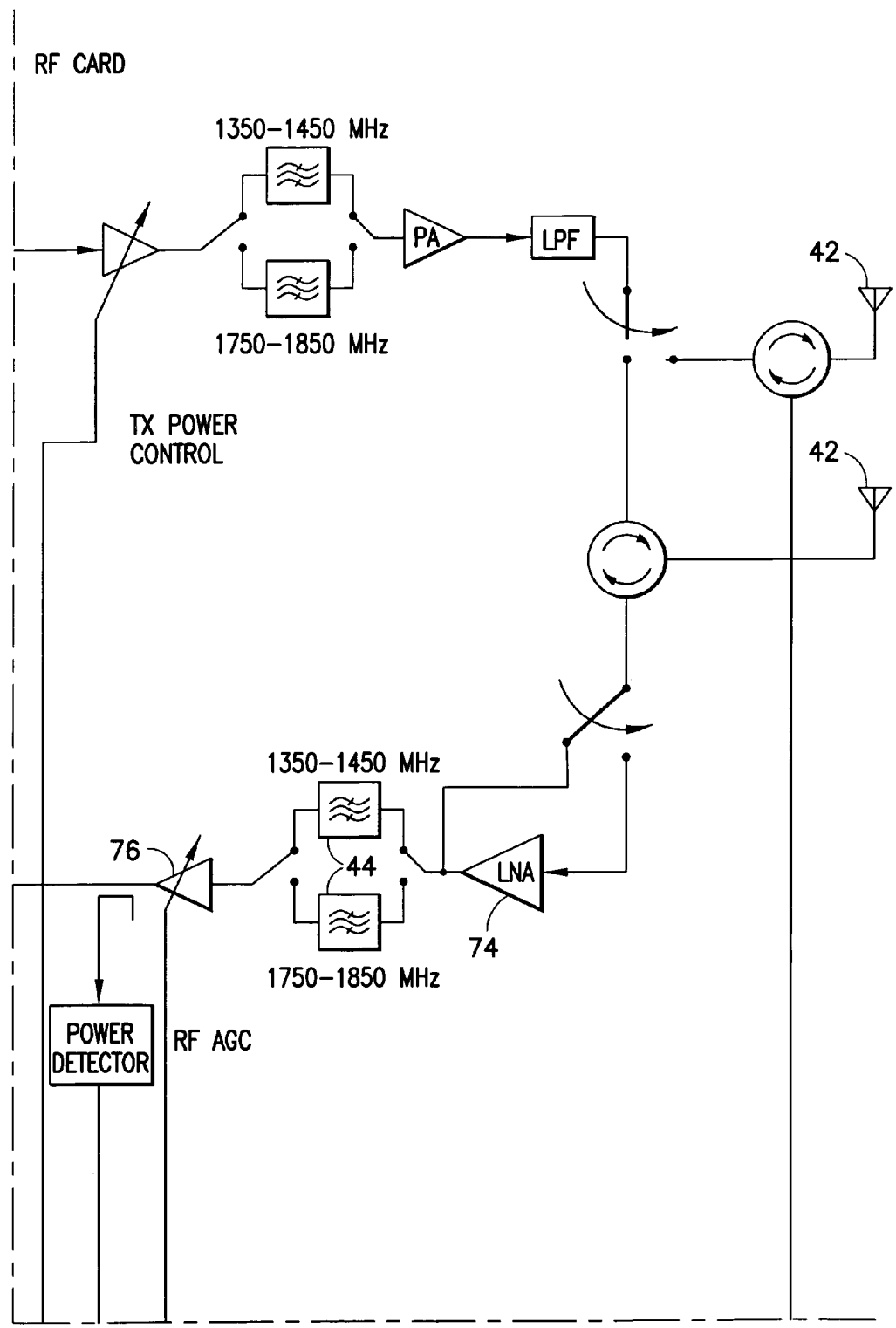
Figure 3E:
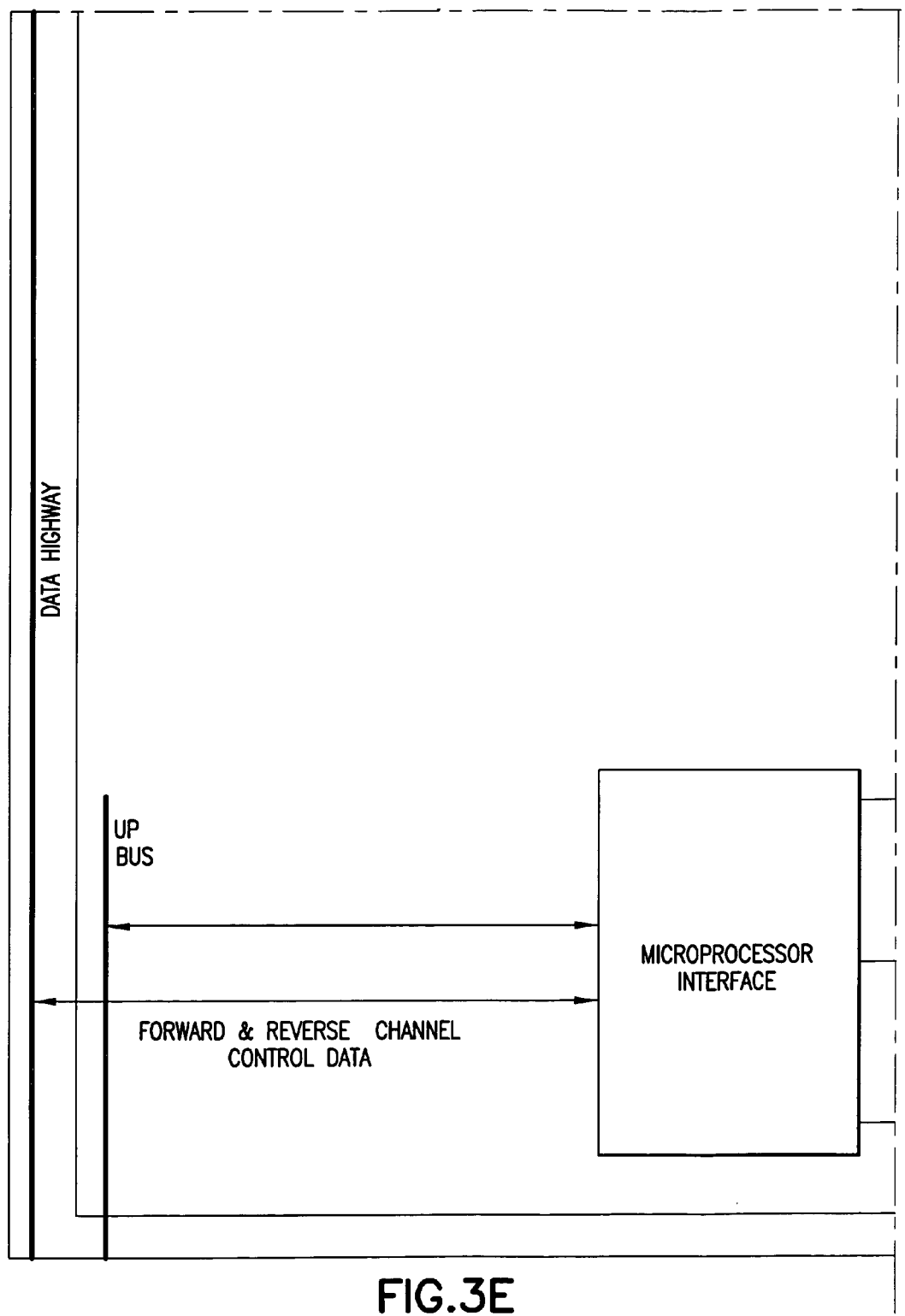
Figure 3F:
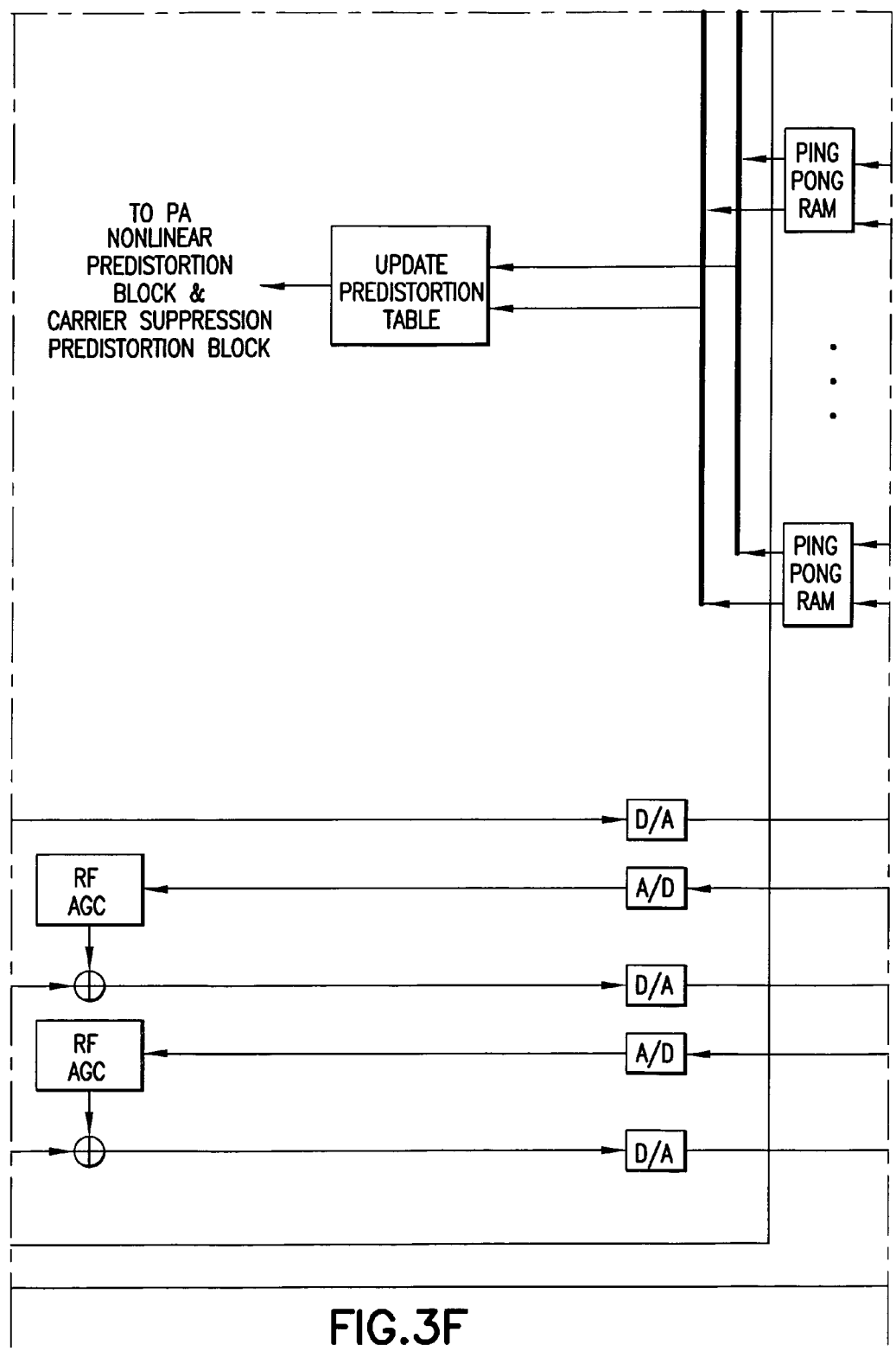
Figure 3G:
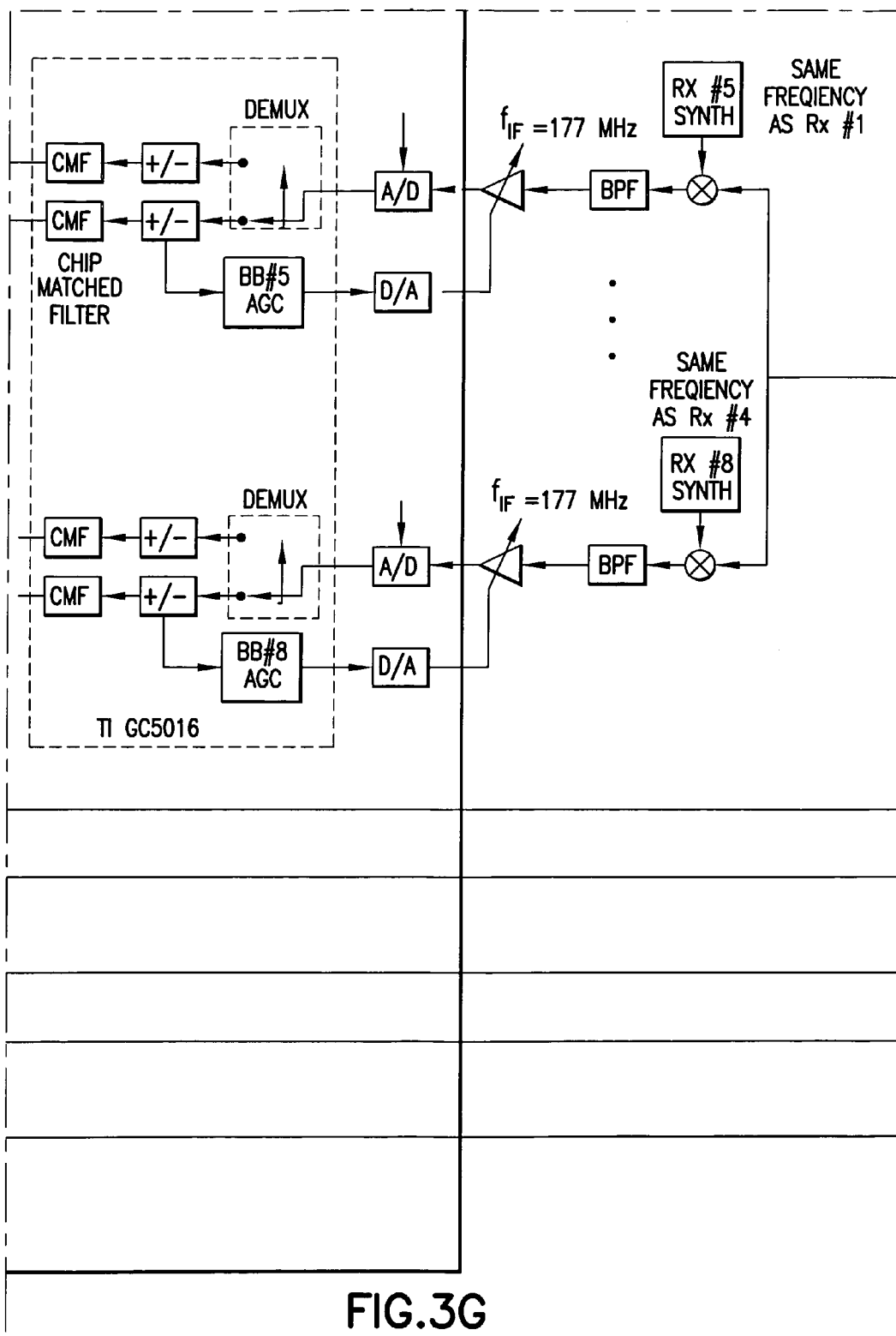
Figures 3, 3H:
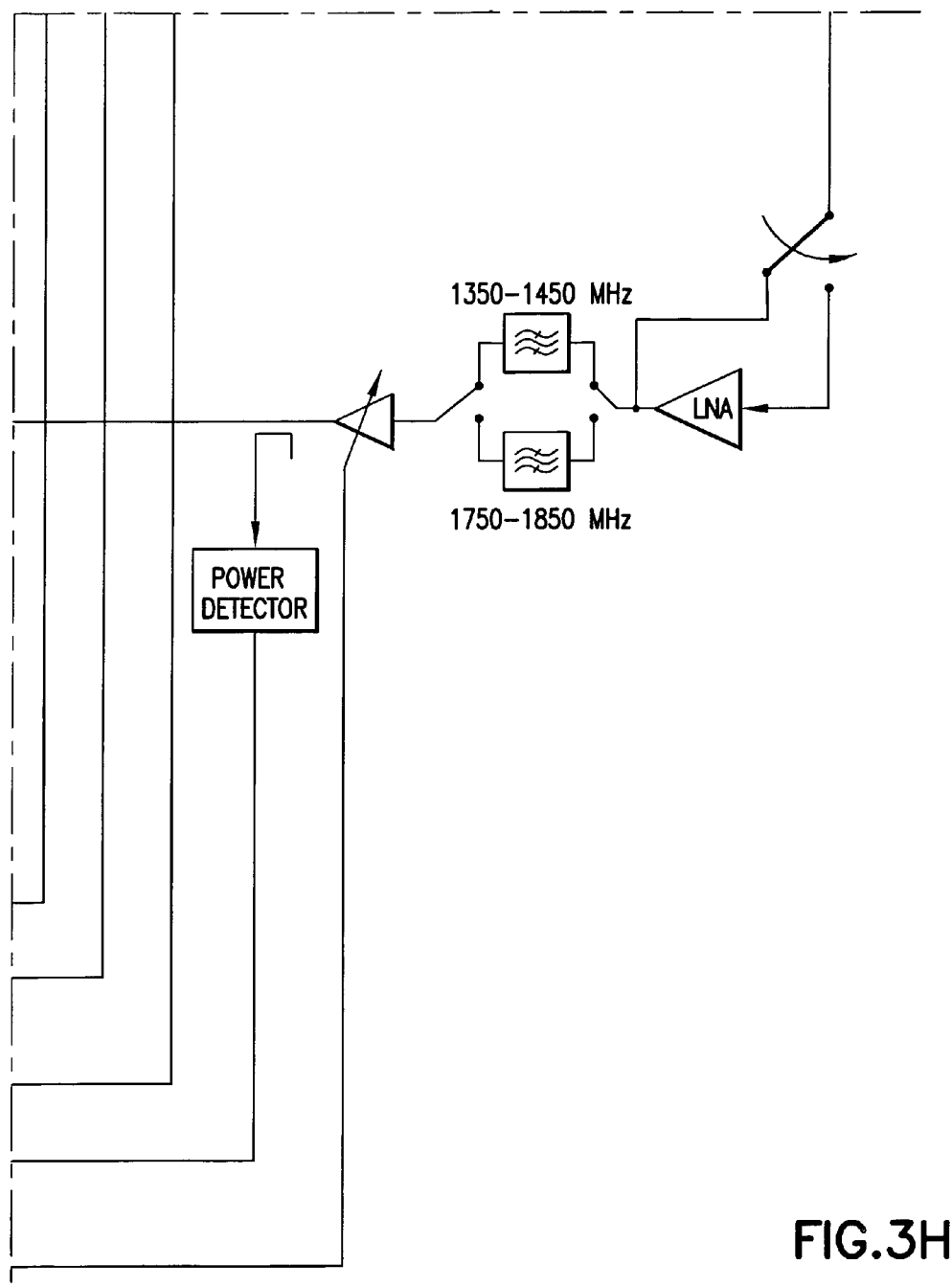

FIG. 3 is a detailed block diagram of the receiver 40 front end, showing additional detail as compared to that of FIG. 2. The antenna 42, filters 44, and analog-to-digital converters 48 are labeled as in FIG. 2. A modem card 70 includes a filed programmable gated array FPGA 72. A signal received at the antenna 42 is amplified at a low noise amplifier 74, filtered 44, and again amplified at an automatic gain control circuit 76. Following, it is downconverted 46 to baseband and filtered again at a bandpass filter 77 before being digitally sampled at an analog-to-digital converter 48 on the modem card 70. The signal is then demultiplexed 78, chip-wise filtered 79, and stored in a ping-pong RAM buffer 50. At this juncture, the entire set of user signals is stored in the RAM buffer 50. Timing, energy, and noise estimates are taken for each signal at a chip acquisition FIR filter 54, and the chips are despread at a matched filter 56. However, the chip acquisition filter 54 also outputs to the symbol matched filter 56, canceling the lower power user signals so the only signals operated on by the matched filter 56 are those with received power in the highest band. The equalizer 58 and decoder 60 are also shown. The estimated transmitted symbol r(t) is output from the decoder to a data highway bus 80, and also to a e-encoder 64 where the signals of the highest power band are re-encoded and remodulated, and then re-spread at a spreader 66 that form part of the feedback loop 62. The re-processed signals of the highest power band are returned to an adder bus 52 through the feedback loop 62, where they are subtracted from the original signal remaining in the RAM 50, leaving only the original signal minus the highest power band as inputs to the chip acquisition filter 54 and the matched filter 56. The chip acquisition filter 54 operates only on each of the remaining highest power band signals, which is in this iteration only the second highest power band of the original signal set. The matched filter 56 then operates on that second highest power band, and the iteration continues until all signals of the original signal set are processed within one of the power bands.

Further detail as to acquisition of timing and energy estimates, and to placement of pilot signals in transmission to facilitate that timing and amplitude recovery, may be found in co-owned and co-pending U.S. patent application Ser. No. 11/364,990, entitled "Dispersed Pilot Signals for Estimating Timing Delay" filed on Feb. 28, 2006.

The present multi-user receiver is particularly well adapted for use in a mesh network such as that shown in FIG. 1, where network nodes may communicate directly when in range of one another or through another relaying network node when not in direct range. A particularly apt waveform for such a mesh network is shown and described in co-owned and co-pending U.S. patent application Ser. No. 11/335,439, entitled "Hybrid Multiple Access Waveform, Method and Apparatus" filed on Jan. 18, 2006 and herein incorporated by reference.

The multiple access waveform of the above-incorporated application is shown in FIG. 4, where various users may access the communication system by one of at least two modes. A frame 83, preferably 40 msec in duration, includes time-partitioned bursts 84 and code-partitioned bursts 85, by which the respective bursts are partitioned for multiple access via a first time mode or a second spreading code mode. Shown are four time slots A-D in each of four different frequency bands F1-F4. As indicated by the axes legend 86, time distinction is along the horizontal, frequency distinction is along the vertical, and code distinction is along an axis normal to the page. The communication spectrum that is available for use in the mesh network system is first parsed according to a frequency division like FDMA into four different frequency bands, F1, F2, F3, and F4. The spectrum in each of the frequency bands F1-F4 is then parsed into a series of time slots A, B, C, D. The time slots A-D of the different frequency bands F1-F4 are synchronous and preferably separated by a guard interval 91. They are synchronous in order that access may be via either of the two modes simultaneously. That is, multiple access may be obtained in a first time slot A of one frequency band F1 via code slots, and in that same first time slot A of another frequency band F2 via time sub-slots. Synchronous time slots also enables multiple access into sequential time slots of one frequency band by different modes, such as time sub-slots in time slot A of frequency band F2 and code slots in time slot B of that same frequency band F2.

The particular modes of multiple access in FIG. 4 are detailed. Consider the time slot C of the frequency band F4 (slot C/F4), which is shown in exploded view in FIG. 4. A total of eight time sub-slots are available, for use by up to eight different users within that overall C/F4 slot of time/frequency. Various spectrum allowances are indicated for overhead 87, network control and maintenance 88, and acquisition pilot signals 89. What remains are eight payloads 90 within slot C/F4 that may carry data from each of eight different users. Of course, less active users within a particular slot C/F4 might entail more than one payload 90 carrying data from one user so as not to waste the spectrum. However, partitioning of the time slot according to the first mode into time sub-slots supports a maximum number of disparate users, preferably eight.

Now consider the time slot D of the frequency band F1 (slot D/F1), which is also shown in exploded view in FIG. 4. A total of eight code slots are available, for use by up to eight different users within that overall D/F1 slot of time/frequency. A code slot is a spread spectrum portion of the time/frequency bounded slot 85 that allows spread spectrum multiple access within the confines of that overall time slot 85, and is depicted as one layer of the eight depicted layers for each of the code-partitioned time slots 85. Various spectrum allowances are again indicated for overhead 87, network control and maintenance 88, and acquisition pilot signals 89. What remains are three payloads 90 within each code slot of the overall time slot D/F1 that carry data from a single user in that code slot. That is, while the payload for a single code slot may be interrupted by non-payload data, only one user accesses the network via a single code slot of a time slot 85. The code-partitioned time slots 85 enable up to the maximum number of (preferably eight) multiple users via different spreading codes. Preferably, both the first and second modes support the same maximum number of disparate users. The MRW's ability to carry eight messages per time-frequency slot in the first or second modes of operation allows communication at 800 messages per second in each frequency band in both standard and relay configurations, even where both communicating nodes are not ground based.

The receiver of the present invention is particularly well adapted to such a hybrid network as in FIG. 4. For the code-partitioned slots 85, the receiver operates as particularly described above.

While there has been illustrated and described what is at present considered to be preferred and alternative embodiments of the claimed invention, it will be appreciated that numerous changes and modifications are likely to occur to those skilled in the art. It is intended in the appended claims to cover all those changes and modifications that fall within the spirit and scope of the claimed invention.

What is claimed is:

1. A method for acquiring signals received from multiple users in a single burst, comprising:
   storing in a memory a plurality of signals received from multiple users;
   using a processor, estimating transmitted symbols for each signal within a first group of the plurality of signals, said first group having a received power level within a first band;
   using the processor, determining a modified set of signals that excludes the signals of the first group by subtracting from the stored signals the estimated transmitted symbols for each signal within the first group to yield the modified set of signals;
   from the modified set of signals, canceling with the processor multiuser interference among signals within a second group of the plurality of signals, said second group having a received power level within a second band having a lower bound less than a lower bound of the first band; and
   estimating by the processor transmitted symbols for each signal within the second group.

2. The method of claim 1 further comprising re-encoding the estimated transmitted signals for each signal within the first group.

3. The method of claim 1 further comprising re-spreading the estimated transmitted signals for each signal within the first group.

4. The method of claim 1, further comprising canceling multiuser interference among signals within the first group prior to estimating transmitted symbols.

5. A multi-user receiver for acquiring signals received from multiple users in a single burst, comprising:
   a buffer storing a plurality of signals received from multiple users; and
   a processor configured to:
      estimate transmitted symbols for each signal within a first group of the set plurality of signals, said first group having a received power level within a first band;
      determine a modified set of signals that excludes the signals of the first group by subtracting from the stored signals the estimated transmitted symbols for each signal within the first group to yield the modified set of signals;
      from the modified set of signals, cancel multiuser interference among signals within a second group of the plurality of signals, said second group having a received power level within a second band having a lower bound less than a lower bound of the first band; and
      estimate transmitted symbols for each signal within the second group.

6. The multi-user receiver of claim 5, wherein the processor is further configured to re-encode the estimated transmitted signals for each signal within the first group.

7. The multi-user receiver of claim 5, wherein the processor is further configured to re-spread the estimated transmitted signals for each signal within the first group.

8. The multi-user receiver of claim 5, wherein the processor is further configured to cancel multiuser interference among signals within the first group prior to estimating transmitted symbols.

* * * * *